Patented Dec. 22, 1931

1,837,274

UNITED STATES PATENT OFFICE

MAX ALBERT KUNZ, OF MANNHEIM, KARL KOEBERLE, OF LUDWIGSHAFEN-ON-THE-RHINE, AND WALTER BRUCK, OF MANNHEIM, GERMANY, ASSIGNORS TO GENERAL ANILINE WORKS INC., OF NEW YORK, N. Y., A CORPORATION OF DELAWARE

DYESTUFFS OF THE DIBENZANTHRONE SERIES

No Drawing. Application filed July 24, 1929, Serial No. 380,750, and in Germany August 7, 1928.

The present invention relates to the production of vat dyestuffs from nitro dibenzanthrones.

We have found that valuable dyestuffs of the dibenzanthrone or iso-dibenzanthrone series, which for the most part dye grey shades, are obtained by heating nitro dibenzanthrones which term is meant to comprise nitro derivatives of dibenzanthrone, iso-dibenzanthrone and derivatives thereof, alone or in an organic diluting medium to temperature above 100° C. which, however, should not be so high as to destroy the dyestuffs, preferably between about 150° and 250° centigrade. The before-mentioned organic diluting media comprise, for example, nitrobenzene, nitrotoluol, naphthalene, nitro naphthalene and the like. Small amounts of catalytic substances, such as metals and non-alkaline compounds may be added to the reaction mixture.

The dyestuffs obtained in accordance with the process of the present invention generally speaking dissolve in concentrated sulphuric acid to give violet red or green colorations and dye cotton grey shades of an excellent fastness from a vat which is usually blue.

The following examples will further illustrate how the said invention may be carried out in practice, but the invention is not restricted to these examples. The parts are by weight.

Example 1

Bz. 2-nitro dibenzanthrone (prepared by the nitration of pure dibenzanthrone in nitrobenzene by means of nitric acid at temperatures below 10° centigrade) is heated in a finely divided state while stirring until it sinters. The dyestuff obtained which is a dark blue powder, dissolves in concentrated sulphuric acid to give a violet red coloration and dyes cotton very fast neutral grey shades from a blue vat.

When nitro isodibenzanthrone (prepared, for example by the nitration of isodibenzanthrone in nitrobenzene by means of nitric acid) is employed instead of nitrodibenzanthrone, a reaction product which dyes reddish grey shades is obtained.

Example 2

5 parts of nitro dibenzanthrone (prepared by the nitration of dibenzanthrone in nitrobenzene by means of nitric acid) are boiled in 75 parts of nitrobenzene for 24 hours. The reaction product is filtered off by suction while hot, extracted with 250 parts of trichlor benzene and treated with steam. The reaction product which is obtained in excellent yield dissolves in concentrated sulphuric acid to give a red violent coloration and dyes cotton very fast grey to black shades from a blue vat.

Example 3

A suspension of 50 parts of nitro dibenzanthrone obtained according to Example 2 of the United States Patent No. 796,393 in 1000 parts of nitrobenzene is boiled until a sample gives pure blue grey dyeings. Then the product is filtered off by suction, or the nitrobenzene distilled off, if desired, under reduced pressure or in steam. The dyestuff which is a blue black powder, dissolves in concentrated sulphuric acid to give a violet coloration and dyes cotton blue grey to blue black shades of excellent fastness from a reddish blue vat.

What we claim is:—

1. A process of producing vat dyestuffs of the dibenzanthrone series, which comprises heating a nitro dibenzanthrone in the absence of any condensing agent to above 100° centigrade, but not so high as to destroy the dyestuff.

2. A process of producing vat dyestuffs of the dibenzanthrone series, which comprises heating a nitro dibenzanthrone in the absence of any condensing agent to between about 150° and 250° centigrade.

3. A process of producing vat dyestuffs of the dibenzanthrone series, which comprises heating a nitro dibenzanthrone in the absence of any condensing agent to above 100° centigrade in an inert aromatic diluent of high boiling point.

4. As a new article of manufacture the vat dyestuff, which forms a dark blue powder, dissolving in concentrated sulphuric acid to give a violent red coloration, dyes cotton very fast neutral grey shades from a blue vat and which is obtainable by sintering pure Bz 2-nitro dibenzanthrone.

In testimony whereof we have hereunto set our hands.

MAX ALBERT KUNZ.
KARL KOEBERLE.
WALTER BRUCK.